United States Patent
Kim et al.

(10) Patent No.: US 11,636,824 B2
(45) Date of Patent: Apr. 25, 2023

(54) DISPLAY APPARATUS AND CONTROL METHOD THEREOF FOR VARIABLY DISPLAYING USER INTERFACE

(71) Applicant: SAMSUNG ELECTRONICS CO., LTD., Suwon-si (KR)

(72) Inventors: Seokhyun Kim, Suwon-si (KR); Hyeryung Kim, Suwon-si (KR); Eunhee Park, Suwon-si (KR); Arum Choi, Suwon-si (KR); Sugyeong Hyeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/094,228

(22) Filed: Nov. 10, 2020

(65) Prior Publication Data
US 2021/0142760 A1    May 13, 2021

(30) Foreign Application Priority Data
Nov. 11, 2019    (KR) .................. 10-2019-0143189

(51) Int. Cl.
*G09G 5/00*    (2006.01)
(52) U.S. Cl.
CPC ......... *G09G 5/005* (2013.01); *G09G 2340/04* (2013.01); *G09G 2354/00* (2013.01)
(58) Field of Classification Search
None
See application file for complete search history.

(56) References Cited

U.S. PATENT DOCUMENTS

| | | | |
|---|---|---|---|
| 8,416,267 B2 | 4/2013 | Park et al. | |
| 8,810,605 B2 | 8/2014 | Park et al. | |
| 8,819,588 B2 | 8/2014 | Seong et al. | |
| 9,122,386 B2 | 9/2015 | Park et al. | |
| 9,275,433 B2* | 3/2016 | Kim | G06F 3/048 |
| 9,285,883 B2 | 3/2016 | Bi et al. | |
| 10,185,703 B2 | 1/2019 | Abrahami | |
| 10,817,022 B2 | 10/2020 | Cho et al. | |
| 10,963,209 B2 | 3/2021 | Shim | |

(Continued)

FOREIGN PATENT DOCUMENTS

| | | | | |
|---|---|---|---|---|
| EP | 2833260 A1 * | 2/2015 | | G06F 8/38 |
| JP | 6321247 B1 | 5/2018 | | |

(Continued)

OTHER PUBLICATIONS

Jiang et al, 'ORC Layout: Adaptive GUI Layout with OR-Constraints', CHI 2019, pp. 1-12, May. (Year: 2019).*

(Continued)

*Primary Examiner* — Patrick F Valdez
(74) *Attorney, Agent, or Firm* — Sughrue Mion, PLLC

(57) ABSTRACT

A display apparatus includes a display and a processor. The processor is configured to: based on a user command for displaying a UI being input, identify at least one from among a size of the display and a ratio of the display, determine a size of the UI and a layout of the UI to correspond to the at least one from among the scale and the ratio of the display, and control the display to display a plurality of UI elements in the UI, according to the size and the layout of the UI.

19 Claims, 12 Drawing Sheets

(56) References Cited

U.S. PATENT DOCUMENTS

| | | | |
|---|---|---|---|
| 2007/0266335 A1* | 11/2007 | Zielinski | G06F 9/44505 |
| | | | 715/761 |
| 2009/0058885 A1 | 3/2009 | Park et al. | |
| 2010/0146440 A1 | 6/2010 | Seong et al. | |
| 2011/0107244 A1* | 5/2011 | Kinoshita | G06F 9/451 |
| | | | 715/763 |
| 2012/0246678 A1* | 9/2012 | Barksdale | H04N 21/4312 |
| | | | 725/37 |
| 2013/0127918 A1* | 5/2013 | Kang | G06F 3/0487 |
| | | | 345/660 |
| 2013/0222434 A1 | 8/2013 | Park et al. | |
| 2013/0227469 A1 | 8/2013 | Park | |
| 2014/0143691 A1* | 5/2014 | Huang | H04N 21/42202 |
| | | | 715/762 |
| 2014/0203999 A1 | 7/2014 | Shim | |
| 2014/0362116 A1* | 12/2014 | Park | G06T 3/4092 |
| | | | 345/634 |
| 2015/0135090 A1 | 5/2015 | Park | |
| 2015/0355816 A1 | 12/2015 | Shim | |
| 2016/0188280 A1 | 6/2016 | Shim | |
| 2016/0358311 A1* | 12/2016 | Chen | G06F 40/109 |
| 2017/0140504 A1* | 5/2017 | Jeong | G06T 3/40 |
| 2018/0373397 A1 | 12/2018 | Welicki et al. | |
| 2018/0374452 A1 | 12/2018 | Choi et al. | |
| 2020/0167121 A1 | 5/2020 | Shim | |

FOREIGN PATENT DOCUMENTS

| | | |
|---|---|---|
| KR | 10-1397685 B1 | 5/2014 |
| KR | 10-1445603 B1 | 9/2014 |
| KR | 10-1510758 B1 | 4/2015 |
| KR | 10-1546725 B1 | 8/2015 |
| KR | 10-1571096 B1 | 11/2015 |
| KR | 10-1667266 B1 | 10/2016 |
| KR | 10-2017-0058816 A | 5/2017 |
| KR | 10-2017-0125004 A | 11/2017 |
| KR | 10-1822463 B1 | 1/2018 |

OTHER PUBLICATIONS

Jiang et al, 'ORC Layout: Adaptive GUI Layout with OR-Constraints', CHI 2019, pp. 1-12. (Year: 2019).*

Florins et al, 'Graceful Degradation of User Interfaces as a Design Method for Multiplatform Systems', IUI'04. (Year: 2004).*

Oscar Sanchez Ramon, 'Model-Driven Reverse Engineering of Legacy Graphical User Interfaces', ASE'10. (Year: 2010).*

International Search Report (PCT/ISA/210) issued by the International Searching Authority in International Application No. PCT/KR2020/014789, dated Feb. 10, 2021.

Written Opinion (PCT/ISA/237) issued by the International Searching Authority in International Application No. PCT/KR2020/014789, dated Feb. 10, 2021.

* cited by examiner

DISPLAY APPARATUS AND CONTROL METHOD THEREOF FOR VARIABLY DISPLAYING USER INTERFACE

CROSS-REFERENCE TO RELATED APPLICATION(S)

This application is based on and claims priority under 35 U.S.C. § 119 to Korean Patent Application No. 10-2019-0143189, filed on Nov. 11, 2019, in the Korean Intellectual Property Office, the disclosure of which is incorporated by reference herein in its entirety.

BACKGROUND

1. Field

The disclosure relates to a display apparatus and a control method thereof. More specifically, the disclosure relates to a display apparatus which display a user interface (UI) that changes according to a screen element of a display and a control method thereof

2. Description of Related Art

With the development of electronic technologies, various display apparatuses have been developed. In particular, various display apparatuses such as an ultra-large display apparatus, a rollable display apparatus with a changeable size of the display area, and a rotatable display apparatus with changeable ratio have been developed.

With the screens of the display apparatus becoming large-scale, and the size and the ratio of screens being able to be changed, there has been an economic loss in having to provide a UI expanded to the same expanded screen ratio or having to individually design a UI matching the corresponding display apparatus according to the methods of the related art.

SUMMARY

Embodiments provide a display apparatus which determines a size and a layout of a UI according to a size and a ratio of a screen of a display apparatus, and arranges a UI element according to a layout of the UI and a control method thereof Embodiments provide an optimum UI size, location, layout, and the like according to a size and a ratio of the display.

Additional aspects will be set forth in part in the description which follows and, in part, will be apparent from the description, or may be learned by practice of the presented embodiments of the disclosure.

In accordance with an aspect of the disclosure, a display apparatus includes a processor configured to, based on a user command for displaying a display and a UI being input, identify at least one from among the size and ratio of the display, determine a size and layout of the UI corresponding to at least one from among the identified size or ratio of the display, and control the display to display a plurality of UI elements according to the determined layout of the UI.

In accordance with an aspect of the disclosure, a control method of a display apparatus includes identifying at least one from among a size and ratio of the display based on a user command for displaying a UI being input, determining a size and layout of the UI corresponding to at least one from among the identified size or ratio of the display, and displaying a plurality of UI elements according to the determined layout of the UI.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Herein, various embodiments are described as examples to assist in the understanding of the description, and it is to be understood that various modifications may be made to embodiments. In addition, to assist in the understanding of embodiments, the accompanied drawings might not be to actual scale, but some elements may be illustrated exaggerated in dimension.

The terms used herein are general terms selected in consideration of the functions of the various embodiments. However, these terms may vary depending on intention, legal or technical interpretation, emergence of new technologies, and the like of those skilled in the related art. Also, there may be some terms arbitrarily identified by an applicant. The terms may be interpreted based on the meaning defined herein, or construed based on the overall contents and technological common sense of those skilled in the related art, unless otherwise specified.

Herein, the order of each step should be understood to be non-limiting except for when the preceding step must be performed logically and temporally before the following step. That is, except for examples such as the above, there is no effect to the nature of embodiments even if the process described as the following step is performed before the process described as the preceding step, and the scope of protection should be defined regardless of the order of the steps.

Herein, expressions such as "include," "may include," "comprise," "may comprise," or the like are used to designate a presence of a corresponding characteristic (e.g., elements such as numerical value, function, operation, or component, etc.), and not to preclude a presence or a possibility of additional characteristics.

In embodiments, some elements may be modified or omitted, and other elements may be added. In addition, the elements may be distributed and disposed in independent apparatuses different from one another.

Certain embodiments will be described in greater detail below with reference to the accompanying drawings.

Figure 1:
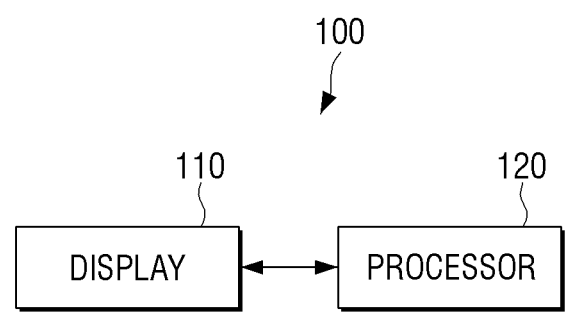
FIG. 1 is a block diagram illustrating a display apparatus according to an embodiment.

FIG. 1 is a block diagram illustrating a display apparatus according to an embodiment.

The display apparatus 100 according to an embodiment may be implemented to various display apparatuses such as, for example, and without limitation, a television (TV), a smart TV, a monitor, an electronic frame, an electronic whiteboard, an electronic table, a notebook, a tablet PC, a desktop, a large format display (LFD), or the like.

Referring to FIG. 1, the display apparatus may include one or more displays 110 and a processor 120.

The display 110 may display a UI and a UI element. For example, the UI may be a variety of screens such as, for example, and without limitation, an application execution screen, a menu screen, a lock screen, a setting screen, a standby screen, or the like.

The UI element may refer to an element included in the UI. For example, the UI element may include a content, an icon, a text, a widget, and a graphic item. The UI element may be displayed according to a layout of the UI. The 'layout of the UI' may refer to a display method of a number of UI elements included in the UI, a location of the element, and an item within the element. That is, the meaning of "change of layout" may refer to the number of UI elements on the screen being changed, the location of the UI element being changed, or the display method of an item within the UI element being changed (e.g., changing moving image content to icon). The location of the UI element may be a relative location between the UI elements. In an embodiment, an example of only the size of the UI element decreasing based on the layout being maintained is described, but this is not limiting.

The display 110 may be divided into a plurality of grids according to a predetermined distance. The display 110 may arrange and display the UI and the plurality of UI elements based on the plurality of grids.

The display 110 may display various images. The image may include at least one of a still image or a moving image, and the display 110 may display various images such as a broadcast content or a multimedia content.

The ratio of the display 110 may be realized to various ratios including 21:9, 16:9, 4:1, 1:1, and 9:21. In an embodiment, the "ratio of the display" may refer to the content, the full screen displaying the image or the UI, or the width to length ratio (width/length) of the entire area of the screen. That is, the ratio of the display 110 may refer to the ratio of the screen of the display.

In addition, the ratio of the display 110 may be changed according to an input of the user, and the display 110 may be implemented to a rollable display or a rotatable display, and the ratio of the display 110 may be changed according to an operation of the rollable display or the rotatable display.

The size of the display 110 may decrease or increase. Specifically, the display 110 may be implemented as a foldable display, or a rollable display with the display being rolled out or in. Alternatively, the plurality of displays 110 may be connected or separated, or the like and thereby the size of the display may be changed. In addition, the size of the display 110 may be changed according to an input of the user. In an embodiment, the "size of the display" may refer to the size of the screen or area which displays a content, an image or a UI. That is, the size of the display 110 may refer to the size of the area to which the content is output. For example, based on the display being implemented as a rollable display, if a portion of the display 110 is rolled out of the housing, the size of the entire display may be the same, but the size of the displayable area of the display may be changed, and in this case, the size of the display 110 may be seen as the size of the display 110 being changed.

As described above, the display 110 may be, for example, and without limitation, a liquid crystal display (LCD) panel, a light emitting diode (LED), an organic LED (OLED), a liquid crystal on silicon (LCoS), a digital light processing (DLP), or the like. In addition, the display 110 may be included with a driving circuit, a backlight unit, or the like capable of being implemented to forms such as, for example, and without limitation, a-si TFT, low temperature poly silicon (LTPS) TFT, organic TFT (OTFT), or the like.

In addition, the display 110 may be coupled with the touch panel and implemented as a touch screen. However, this is merely an example, and the display 110 may be variously implemented.

The processor 120 may be electrically connected with the display 110 and control the overall operation of the display apparatus 100. To this end, the processor 120 may include one or more from among a central processing unit (CPU), an application processor (AP), or a communication processor (CP).

The processor 120 may control hardware or software elements connected to the processor 120 by driving an operating system or an application program, and perform various data processing and calculations. In addition, the processor 120 may perform processing by loading instructions or data received from at least one other element to a volatile memory, and store the various data in a non-volatile memory.

The processor 120 may, based on an event for displaying the UI being generated, control the display 110 to display the UI. The event may be an event in which a user command for displaying the UI is input, an event in which a predetermined time arrives, an event in which an image being output is stopped or ended, or the like. However, this is merely an example, and the event for displaying the UI in an embodiment is not limited thereto.

Specifically, the processor 120 may, based on the user command for displaying the UI being input, identify at least one from among a size and a ratio of the display 110. The user command may be a command selecting a specific button provided on the display apparatus 100 or a remote control, a command selecting a menu displayed on the display 110, a command selecting a menu displayed on a user terminal device such as a smartphone, or the like. Accordingly, when a user command is input, the processor 120 may identify at least one from among the size and the ratio of the display 110.

The processor 120 may determine a size and a layout of the UI corresponding to at least one from among the identified size or ratio of the display 110. The processor 120 may determine the size of the UI, e.g., a size of the UI, by further considering a viewing distance of the user.

In addition, the processor 120 may receive the input of the user determining the size or ratio of the display 110, and determining a size and a layout of the UI based on the received user input. For example, the display apparatus 100 may receive a command from the user to divide the display 110 into a plurality of screens, or additionally connect an external display to the display apparatus 100 to cause the size and ratio of the display 110 to be changed. If the size and/or ratio of the display is changed, the processor 120 may determine the size and layout of the UI according to the changed size and/or ratio of the display 110.

The processor 120 may control the display 110 to display the plurality of UI elements according to the determined layout of the UI.

The display 110 may be divided into a plurality of grids according to a predetermined distance, and the processor 120 may be configured to control the display 110 to display by arranging the UI and the plurality of UI elements based on the plurality of grids.

The processor 120 may be configured to control the display 110 to display the UI in a picture-in-picture (PiP) mode or a picture-on-picture (PoP) mode on a layer to which the content is displayed and a separate layer. The processor 120 may be configured to control the display 110 to display the UI on a separate layer, and the separate layer to which the UI is displayed may be displayed on top than the layer to which the content is displayed. With this method, the display apparatus 100 may have the effect of providing the user with content while simultaneously providing the UI.

Figure 2:
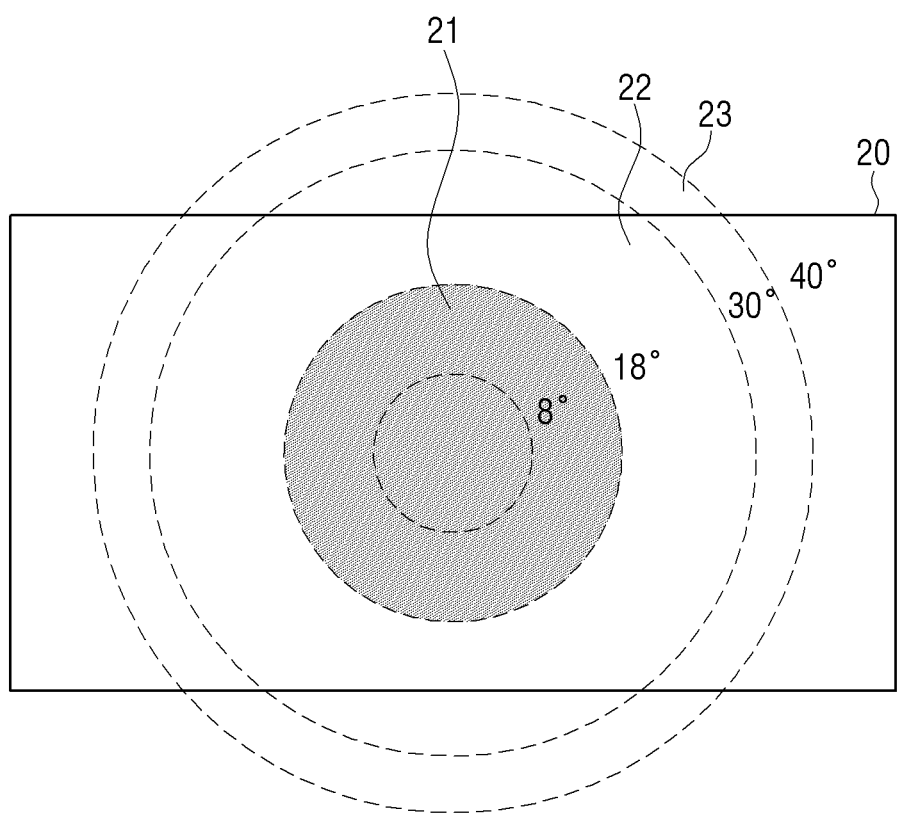
FIG. 2 is a diagram illustrating a view angle of a user and a size of a UI according to an embodiment.

FIG. 2 is a diagram illustrating a view angle of a user and a size of a UI according to an embodiment.

Referring to FIG. 2, a first area 21, a second area 22, and a third area 23 according to a view angle of the user based on a geometric center of a screen 20 of the display are illustrated. The view angle may refer to a recognizable area when the user gazes at a specific location, or may be an angle measured based on a reference line which connects a focal point of the user with the user.

In FIG. 2, the geometric center of the screen 20 of the display may be the point where view angle of the user is 0°. That is, the user may be located in front of the screen 20 of the display, and in a state in which a focal point is formed at the geometric center of the screen 20 of the display. Based on the view angle being smaller, the user may comfortably recognize information without ocular movement, and based on the distance being further, the area corresponding to the same view angle may increase.

For example, the information in a second area 22 in which the view angle of the user corresponds to at 18° to 30° may be recognized easier than that in a third area 23 in which the view angle corresponds to at 30° to 40°. But, it may be more difficult or uncomfortable for the user to recognize information in the second area 22 as compared to that in a first area in which the view angle corresponds to at 0° to 18°.

In addition, the area to which the same view angle corresponds may increase the greater the viewing distance of the user to the display apparatus 100 is, but the environment in which the display apparatus 100 is installed may be so that the securing of the viewing distance is limited to a predetermined range. For example, in a typical household, it may be difficult to secure a viewing distance for more than 4 meters (m).

According to an embodiment, the display apparatus 100 may reduce the size of the UI corresponding to the size of the display by applying a smaller scale factor the more the size of the display 110 is increased. The display apparatus 100 may determine the size of the UI based on the view angle from the limited viewing distance, and the user may easily recognize and interact with the UI.

Figure 3:
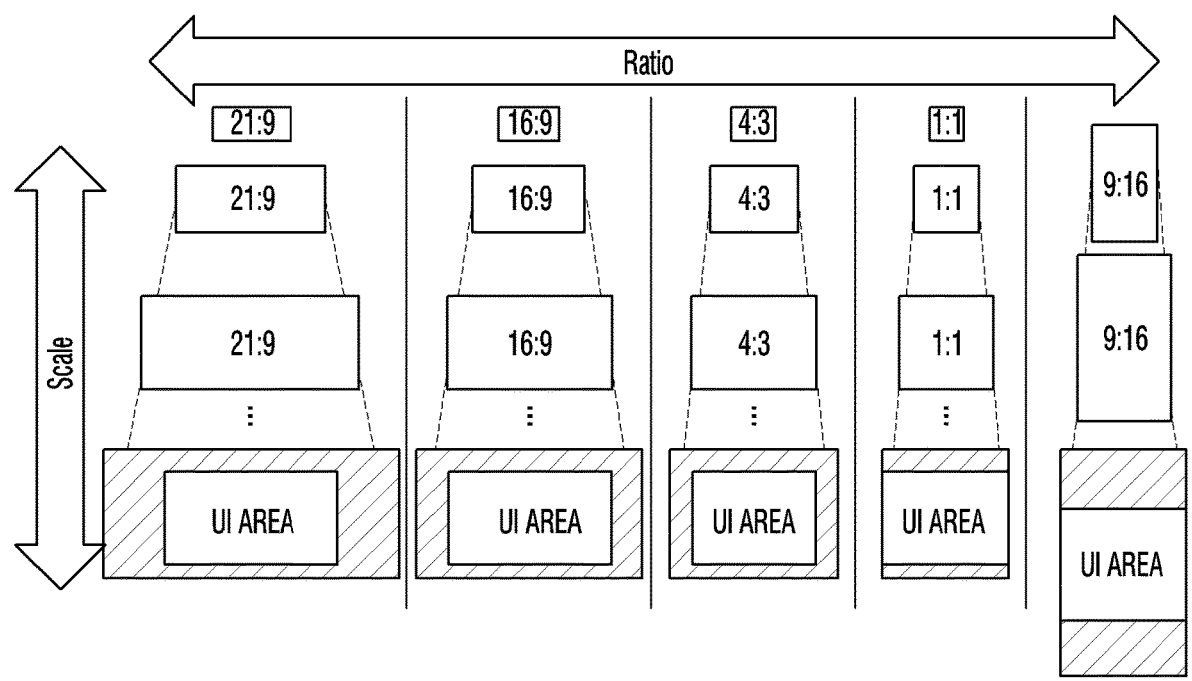
FIG. 3 is a diagram illustrating a method of determining a size of a UI according to an embodiment.

FIG. 3 is a diagram illustrating a method of determining the viewing distance of the user and a size of a UI according to an embodiment.

Referring to FIG. 3, the display apparatus 100 may determine the size of the UI corresponding to the size or ratio of the display 110. The display apparatus 100 may determine the size of the UI according to the viewing distance of the user and the size of the display 110.

According to an embodiment, the display apparatus 100 may, based on a table, for example, Table 1, determine the size of the UI based on the viewing distance of the user and the size of the display 110.

TABLE 1

| Screen Size(in) | Width(in) | Height(in) | Optimum Viewing Distance(m) | Scale Factor |
| --- | --- | --- | --- | --- |
| 32 | 27.9 | 15.7 | 1.5 | 1.125 |
| 40-54 | 34.9 | 19.6 | 2 | 1.0 |
| 55-65 | 47.9 | 27.0 | 2.5 | 1.0 |
| 70-75 | 61.0 | 34.3 | 3 | 1.0 |
| 80-90 | 69.7 | 39.2 | 3.5 | 1.0 |
| 100-144 | 87.1 | 49.0 | 4 | 0.875 |
| 145 | 126.4 | 71.1 | 4 | 0.625 |

Referring to FIG. 3, Table 1 may include information on the size of the screen, the appropriate viewing distance, and the scale factor. For example, based on the display apparatus 100 being implemented as a 32-inch display 110, and the viewing distance of the user being 1.5 m, the display apparatus 100 may apply the scale factor of 1.125 and determine the size of the UI and the size of the plurality of UI elements. Specifically, when the display 110 is implemented as a 32-inch display, because the size of the display 110 may be relatively greater than a reference size of the UI, the display apparatus 100 may determine the size of the UI by multiplying the reference size of UI by 1.125 which corresponds to the scale factor for a pixel value corresponding to the reference size of the UI.

The scale factor may be a predetermined parameter to determine the optimum UI scale, e.g., UI size, based on the view angle of the user, the viewing distance of the user, and the display size. The scale factor may be applied to the UI and the plurality of UI elements. In addition, the scale factor may be limited by a multiple of 1/unit or 1/(8 pixel), and the pixel value of the plurality of UI elements may be a parameter set so as to not have a pixel value of a decimal point or less. Because the pixel value of the plurality of UI elements may be an integer, the UI and the plurality of UI elements may be clearly implemented.

According to an embodiment, the display apparatus 100 may determine the size of the UI based on the view angle of the user and the viewing distance of the user. As described with reference to FIG. 2, the view angle and the viewing distance of the user may correspond to a specific area, and the optimum UI size may be determined when an optimum view angle and an optimum viewing distance is determined. Specifically, when the view angle of the user is e and the viewing distance is x, a radius of the specific area corresponding to the view angle of the user and the viewing distance of the user may be $r = x * \tan(\theta)$.

For example, if the view angle of the user is 30° and the viewing distance of the user is 4 m, the radius of the specific area may be $r = 4 * \tan(30°)$. Through this method, the display apparatus 100 may determine the size of the UI in which a horizontal length may be $2r_1$ and a vertical length may be $2r_2$.

Figure 4:
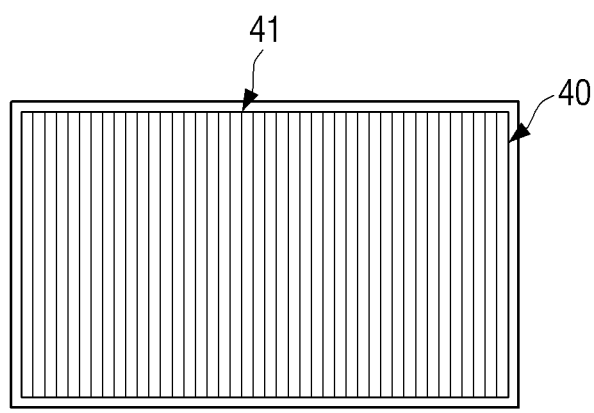
FIG. 4 is a diagram illustrating a plurality of grids according to an embodiment.

FIG. 4 is a diagram illustrating a plurality of grids according to an embodiment.

With reference to FIG. 4, a screen 40 of the display and a plurality of columns 41 including the plurality of grids are illustrated. Although only the plurality of columns 41 arranged along the predetermined distance in the screen 40 of the display is illustrated in FIG. 4, this is merely an example, and the display 110 may be divided into the plurality of grids by a plurality of columns and/or a plurality of rows according to the predetermined distance therebetween.

The display apparatus 100 may linearly arrange the UI and the plurality of UI elements based on the plurality of grids. Specifically, the display apparatus 100 may arrange the UI and the plurality of UI elements according to the column (or row) of the plurality of grids. In addition, the display apparatus 100 may determine the layout of the UI based on a responsive rule which will be described below and arrange the UI and the plurality of UI elements based on the plurality of grids even when rearranging the UI and the plurality of UI elements. That is, all elements of the screen 40 of the display may be aligned based on a plurality of columns 41.

The plurality of grids may include an even number of rows or columns. Referring to FIG. 4, the plurality of columns 41 may be included as an even number, and the display apparatus 100 may use the plurality of columns 41 included in the even number to centrally align the UI element of the screen 40 of the display. According to an embodiment, the display apparatus 100 may, based on the size of the display 110 decreasing, decrease the number of columns 41 of the plurality of grids by two. For example, referring to FIG. 5, the plurality of columns included in a first screen 50-1 of the display 110 may include a greater number of columns than the plurality of columns included in a second screen 50-2.

Figure 5:
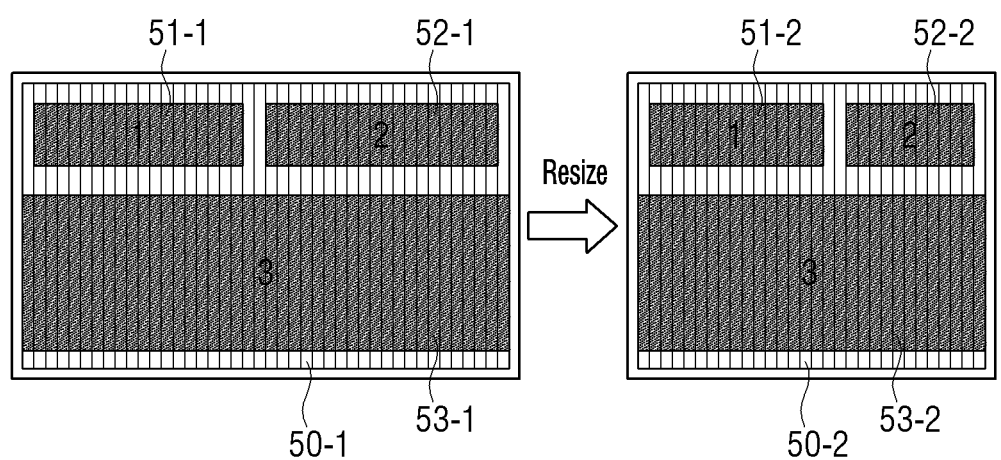
FIG. 5 is a diagram illustrating a responsive rule according to an embodiment.
Figure 6:
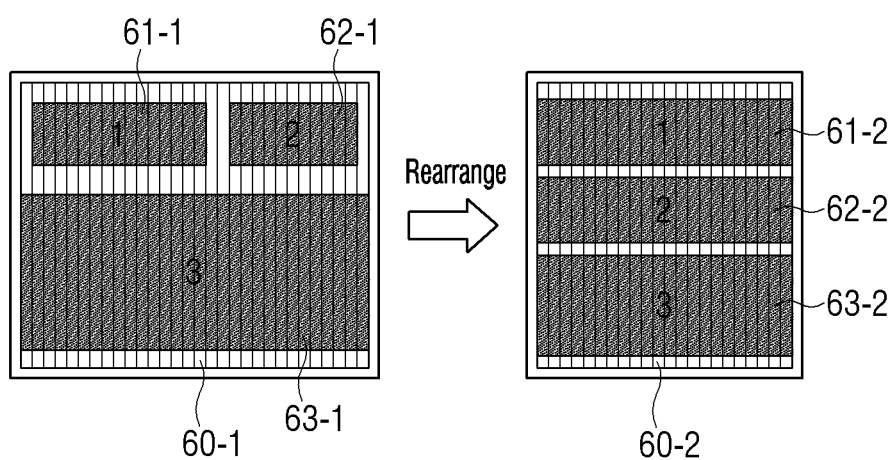
FIG. 6 is a diagram illustrating a responsive rule according to an embodiment.
Figure 7:
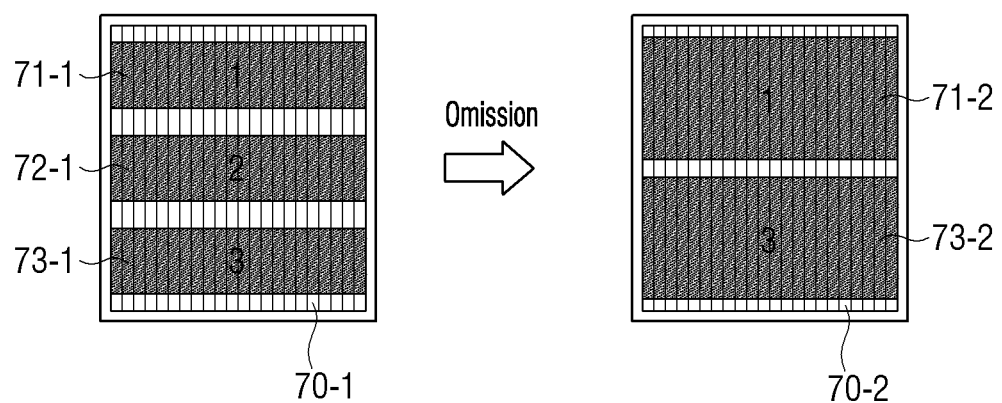
FIG. 7 is a diagram illustrating a responsive rule according to an embodiment.

FIGS. 5 to 7 are diagrams illustrating a responsive rule according to an embodiment. For convenience of description, FIGS. 5 to 7 illustrate an example of the size of the display 110 decreasing, but an embodiment is not limited thereto, and the same method may also be applied in an example of the size of the display 110 increasing. The size of the display 110 may refer to a displayable area of the display 110, that is, the size of the screen of the display.

The display apparatus 100 may determine a scale and a layout of the UI corresponding to at least one from among the size or ratio of the display 110. The layout of the UI may refer to a displaying method of a number of UI elements, a location of the UI element, and items within the UI element. For example, in FIG. 5, the UI elements in the first screen 50-1 may be different in scale as compared to the UI elements in the second screen 50-2, but may have the same layout.

The display apparatus 100 may, when the size of the display 110 is changed, display the UI according to the responsive rule. The responsive rule may refer to arranging the UI element taking into consideration a set value on the scale per component of the UI element including the screen of the display, the margin, and the set value on the alignment method. The responsive rule may refer to arranging the UI element including the screen of the display in the order of resizing, rearranging and omission.

Below, the resizing of the responsive rule will be described in detail with reference to FIG. 5, the rearranging will be described in detail with reference to FIG. 6, and the omission will be described in detail with reference to FIG. 7.

Based on the responsive rule, if the size of the display is changed, the display apparatus 100 may change the scale of the component according to the priority order per each component. For example, referring to FIG. 5, the first screen 50-1 of the display 110 may include a plurality of UI elements 51-1, 52-1 and 53-1, and each element may refer to the UI element. The display apparatus 100 may, based on the size of the first screen 50-1 decreasing to the size of the second screen 50-2, decrease the size of the first UI element 51-1, the size of the second UI element 52-1, and the size of the third UI element 53-1 to be scaled down to match the size of the second screen 50-2. The first to third UI elements 51-1, 52-1 and 53-1 may adjust the size according to the priority order of each of the UI elements. For example, based on the first UI element 51-1 having the lowest level of priority order, and the third UI element 53-1 having the highest level of priority order, the display apparatus 100 may adjust the size sequentially from the first UI element 51-1 to the third UI element 53-1. That is, although the first UI element 51-1 to the third UI element 53-1 are reduced in size, the scaling of the size reduction of the first UI element 51-1 to the third UI element 53-1 is performed differently based on the priority order, e.g., since the first UI element 51-1 has the highest level of priority, the smallest scaling factor is applied to reduce the size of the first UI element 51-1 as compared to the scaling factors applied to reduce the sizes of the second UI element 51-2 and the third UI element 53-2. In addition, the display apparatus 100 may change the first to third UI elements 51-1, 52-1 and 53-1 to a minimum size or a maximum size taking into consideration a predetermined set value on the sizes of the first to third UI elements 51-1, 52-1 and 53-1.

Referring to FIG. 6, if the size of the display 110 has become smaller than the size corresponding to the minimum size of the UI element, the display apparatus 100 may change the layout of the UI. Specifically, the display apparatus 100 may decrease a scale of a first screen 60-1 of the display to a scale of a second screen 60-2 and may determine the layout of the UI corresponding to the decreased size of the display 110.

The display apparatus 100 may determine the layout of the UI considering the predetermined set value on the sizes of the first to third UI elements 61-1, 62-1 and 63-1. For example, when the size of the display 110 is decreased and the width of the second screen 60-2 is smaller than a horizontal direction than a minimum width of one of the first to third UI elements 61-1, 62-1 and 63-1 or the sum of the minimum widths with respect to the widths of the first to third UI elements 61-1, 62-1 and 63-1, the display apparatus 100 may rearrange the first to third UI elements 61-1, 62-1 and 63-1 and arrange the first to third UI elements 61-2, 62-2 and 63-2 along the second screen 60-2 in a vertical direction. That is, the display apparatus 100 may determine the layout of the UI according to the changed size of the display 110.

Referring to FIG. 7, based on the size of the display 110 becoming smaller than the size corresponding to the minimum size of the UI element, the display apparatus 100 may change the layout of the UI. Specifically, the display apparatus 100 may decrease the size of the display 110, and decrease a size of a first screen 70-1 to a size of a second screen 70-2. The display apparatus 100 may determine the layout of the UI corresponding to the decreased size of the display 110. The display apparatus 100 may determine the layout of the UI considering the predetermined set value with respect to the sizes of the first to third UI elements 71-1, 72-1 and 73-1. For example, based on decreasing the size of the first screen 70-1 to have a smaller length than the sum of the minimum lengths in a vertical direction with respect to the lengths of the first to third UI elements 71-1, 72-1 and 73-1, the display apparatus 100 may rearrange the plurality of UI elements by omitting the second UI element 72-1 and re-scaling the first and third UI elements 71-2 and 73-2. That is, the display apparatus 100 may determine the layout of the UI considering the predetermined set value of the plurality of UI elements.

Figure 8:
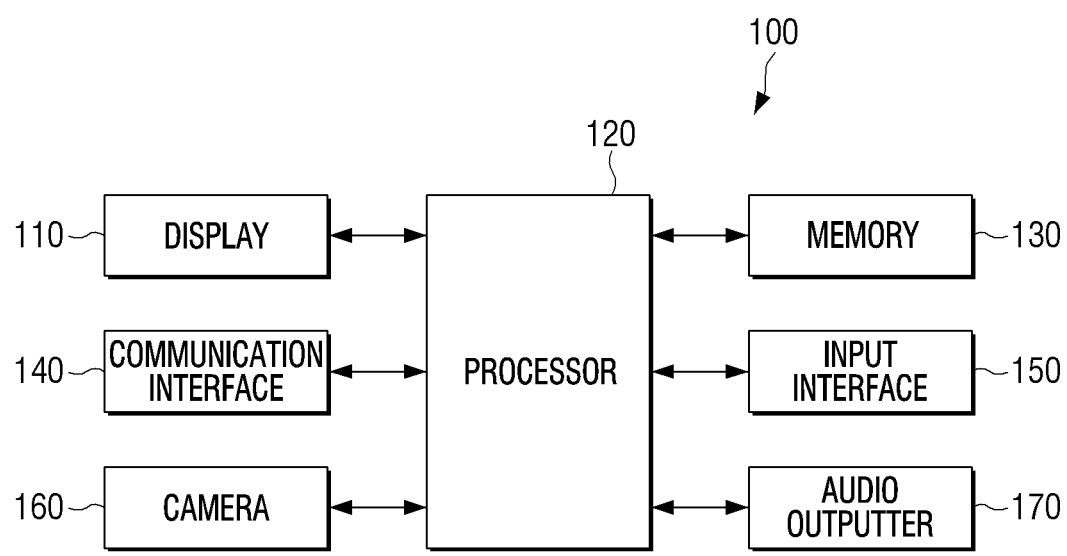
FIG. 8 is a detailed block diagram illustrating a display apparatus according to an embodiment.

FIG. 8 is a detailed block diagram illustrating a display apparatus according to an embodiment.

Referring to FIG. 8, the display apparatus 100 according to an embodiment may include a display 110, a processor 120, a memory 130, a communication interface 140, an input interface 150, a camera 160, and an audio outputter 170. The description overlapping with the description in FIG. 1 with respect to the display 110 and the processor 120 will be omitted.

The memory 130 may store the operating system (OS) for controlling the overall operation of the elements of the display apparatus 100 and instructions or data related to the elements of the display apparatus 100. Specifically, the memory 130 may be implemented as a non-volatile memory, a volatile memory, a flash-memory, a hard disk drive (HDD), a solid-state drive (SSD) or the like. The memory 130 may be accessed by the processor 120, and reading/writing/modifying/deleting/updating or the like of data may be performed by the processor 120. In an embodiment, the term memory may include the memory 130, a read only memory (ROM) within the processor, a RAM, or a memory card mounted to the display apparatus 100 (e.g., a micro SD card, a memory stick). In addition, the memory 130 may store programs, data, and the like to form various screens which will be provided to the display area of the display 110.

Specifically, the memory 130 may store information on a predetermined table which includes information on an appropriate viewing distance and a scale factor. As described with reference to FIG. 3, the display apparatus 100 may use the information on the predetermined table stored in the memory 130 and determine the scale of the UI based on the viewing distance of the user and the size of the display 110.

The display apparatus 100 may include a communication interface 140 for performing communication with an external device. The communication interface 140 may include various communication modules to perform communication with an external device. Specifically, the communication interface 140 may include at least one communication module from among a short-range wireless communication module and a wireless local area network (LAN) communication module. The short-range wireless communication module refers to a communication module which performs data communication wirelessly with an electronic apparatus located in close distance, may be, for example, and without limitation, a Bluetooth module, a ZigBee module, a near field communication (NFC) module, or the like. In addition, the wireless LAN communication module may be a module which performs communication by connecting to an external network according to a wireless communication protocol, such as WiFi or Institute of Electrical and Electronics Engineers (IEEE).

In addition to the above, the communication interface 140 may further include a mobile communication module which performs communication by connecting to a mobile communication network according to the various mobile communication standards such as, for example, and without limitation, 3rd generation (3G), 3rd generation partnership project (3GPP), long term evolution (LTE), or the like. In addition, the communication interface 140 may include at least one from among wired communication modules such as, for example, and without limitation, a universal serial bus (USB), IEEE 1394, RS-232, or the like, or include a broadcast receiving module which receives TV broadcasts.

Specifically, the communication interface 140 may receive, from an electronic apparatus such as a smartphone, a user command for the control of the display apparatus 100. For example, when a user command determining a scale or ratio of the display apparatus 100 is input through the screen of the smartphone, the communication interface 140 may receive, from the smartphone, a user command for determining the scale or ratio of the display 110 of the display apparatus 100.

The display apparatus 100 may be provided with various broadcast services, internet services, or the like from the electronic apparatus through the communication interface 140, communication with a smartphone, notebook, or the like in the surroundings, and connect with a media device such as a sound bar.

The input interface 150 may receive a user command for controlling the display apparatus 100. Specifically, a touch panel for receiving input of a user touch using a hand of the user, a stylus pen, or the like, a physical button for receiving input of a user operation, or the like may be included. In addition thereto, the input interface 150 may be included in an external device capable of employing a wireless communication method with the display apparatus 100. In an embodiment, the external device may be implemented as at least one from among a remote control, a virtual keyboard, a smartphone, or a wearable device.

The input interface 150 may receive input of the user command for outputting content or image or the user command for displaying the UI. The input interface 150 may be implemented as a microphone for receiving input of a command through an utterance speech of the user. Specifically, based on the utterance speech of the user being directly input by the microphone, the processor may be configured to identify the user command by using a speech to text (STT) module.

The display apparatus 100 may include a camera 160 for imaging the user. The camera 160 may image the space the user is present, and the processor 120 may identify the viewing distance by measuring the distance with the display apparatus 100 based on the data imaged by the camera 160. The camera 160 may be a camera 160 capable of generating depth data. The camera 160 may perform photographing only in a fixed direction, and may perform photographing by changing the direction to correspond to the change in the moving path of the user.

The camera 160 may perform imaging of the user face, and the processor 120 may obtain a gaze of the user by analyzing the user face imaged by the camera 160, and determine a location or layout of the UI based on the obtained gaze.

The audio outputter 170 may be a configuration for outputting an audio signal of a content or image being output, various notification sounds, or voice message. The audio outputter 170 may be implemented as an electronic device including an artificial intelligence (AI) speaker and a smartphone which includes the communication interface.

The display apparatus 100 may include a motor, and a sensor. The motor may be a configuration for winding the roll when the display is implemented as a rollable display. Alternatively, the motor may, if the display is a rotatable display, be a configuration for rotating the display 110.

The sensor may include a variety of sensors such as, for example, and without limitation, a gyro sensor, a gesture sensor, an acceleration sensor, a grip sensor, or the like, and may use the data collected in each of the sensors to measure the viewing distance of the user or the scale of the rollable display, or detect the rotation direction of the rotatable display.

The display apparatus 100 is not limited to the above-described configurations of FIG. 8, and some configurations may be added or omitted according to the type of the display apparatus 100.

Figure 9:
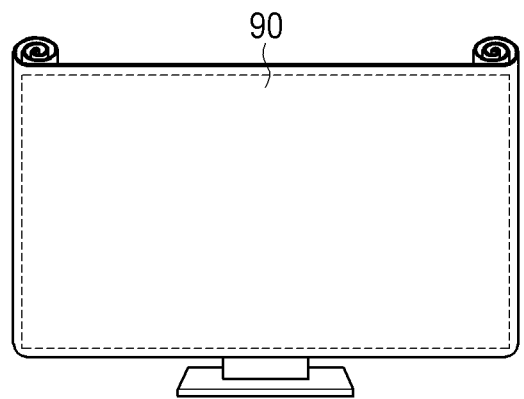
FIG. 9 is a diagram illustrating an example of being implemented as a rollable display according to an embodiment.

FIG. 9 is a diagram illustrating an example of a rollable display according to an embodiment. According to an embodiment, the display apparatus 100 may be include the display 110 being a rollable display. The rollable display may refer to a display 110 in which the size of the display area is changed according to the unrolling of the rolled-up display or rolling in the unrolled display.

Referring to FIG. 9, a displayable area 90 of the rollable display is illustrated. The rollable display may be changed so that the size of the displayable area 90 is changed through a rolling and unrolling.

The display apparatus 100 may, based on the user command for displaying the UI being input, identify at least one from among the size and the ratio of the display 110. The display apparatus 100 may identify the displayable area 90 as a size of the display. The display apparatus 100 may determine the scale and the layout of the UI using the same method as described above with reference to FIGS. 1 to 8, and display the plurality of UI elements.

Figure 10:
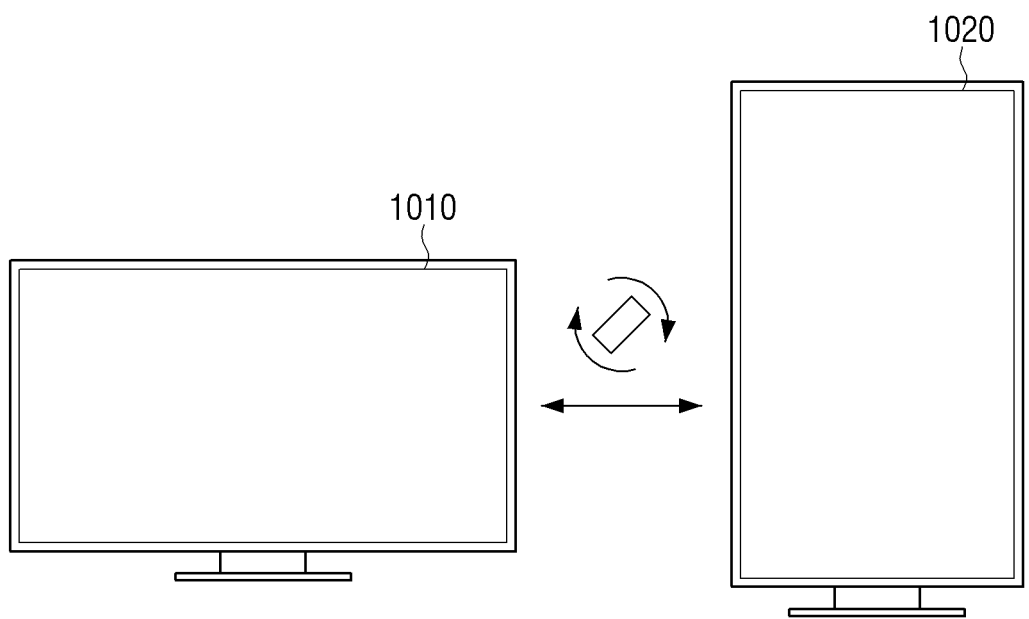
FIG. 10 is a diagram illustrating an example of being implemented as a rotatable display apparatus according to an embodiment.

FIG. 10 is a diagram illustrating an example of being implemented as a rotatable display apparatus according to an embodiment. According to an embodiment, the display apparatus 100 may include a display 110 being a rotatable display. The rotatable display may refer to a display apparatus 100 in which the ratio of the display 110 may be changed according to the rotation.

Referring to FIG. 10, a first orientation 1010 and a second orientation 1020 of the rotatable display are illustrated. The display 110 may be rotated between the first orientation 1010 and the second orientation 1020 perpendicular to the first orientation. That is, the display 110 may be rotated from the first orientation 1010 and be in the second orientation 1020. For convenience of description, the first orientation 1010 is described as a landscape orientation and the second orientation 1020 is described as a portrait orientation.

The display apparatus 100 may rotate the display 110. Specifically, the display 110 may be changed from the first orientation 1010 to the second orientation 1020. For example, when the ratio of the display is 16:9 in the first orientation 1010, the ratio of the display may be 9:16 in the second orientation 1020.

The display apparatus 100 may identify the ratio of the display changed based on the rotation of the display 110 and, based on the identified ratio of the display 110, determine the scale and the layout of the UI.

Specifically, the display apparatus 100 may identify the first orientation 1010 through the sensor capable of detecting the rotation, and then identify the ratio of the display 110 corresponding to the identified orientation. Alternatively, a user command for changing the ratio of the display 110 may be received and the ratio of the display 110 may be changed according to the user command.

The process after the display apparatus 100 has identified the ratio of the display 110 may be performed with the same method as described above with reference to FIGS. 1 to 8.

Figure 11:
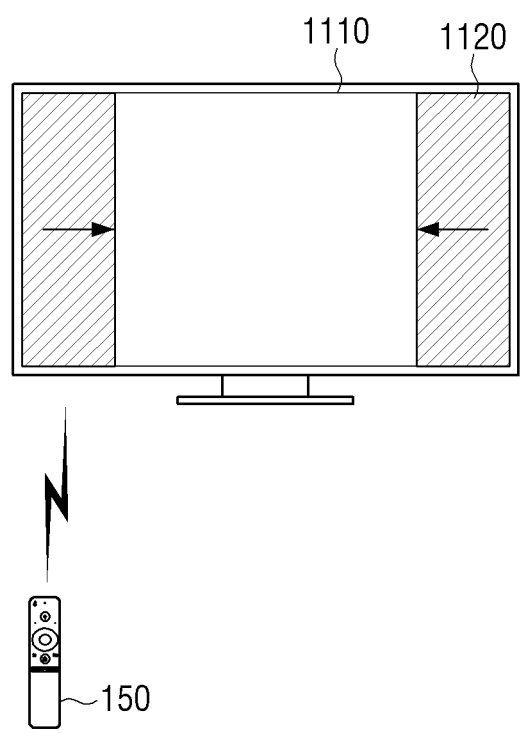
FIG. 11 is a diagram illustrating an operation of a display apparatus based on a user input according to an embodiment.

FIG. 11 is a diagram illustrating an operation of a display apparatus based on a user input according to an embodiment.

The display apparatus 100 may receive the user input by using the input interface 150, and the display apparatus 100 may change the size and ratio of the display 110 according to the received user input. The size and ratio of the display 110 may refer to the size and ratio of the screen or area which displays the content, image or UI. Specifically, after receiving the user input in FIG. 11, the size of the display 110 may refer to a size and ratio of a first screen 1110 while a second screen 1120 is not a screen for displaying the UI. The second screen 1120 may be blackened, overlapped with adjacent display, or be rolled in the opposing portions of the housing that house the rollable display and may be invisible to the user.

Accordingly, the display apparatus 100 may identify at least one from among the size or ratio of the first screen 1110, and determine a size and a layout of the UI corresponding to the identified size and ratio of the first screen 1110.

Figure 12:
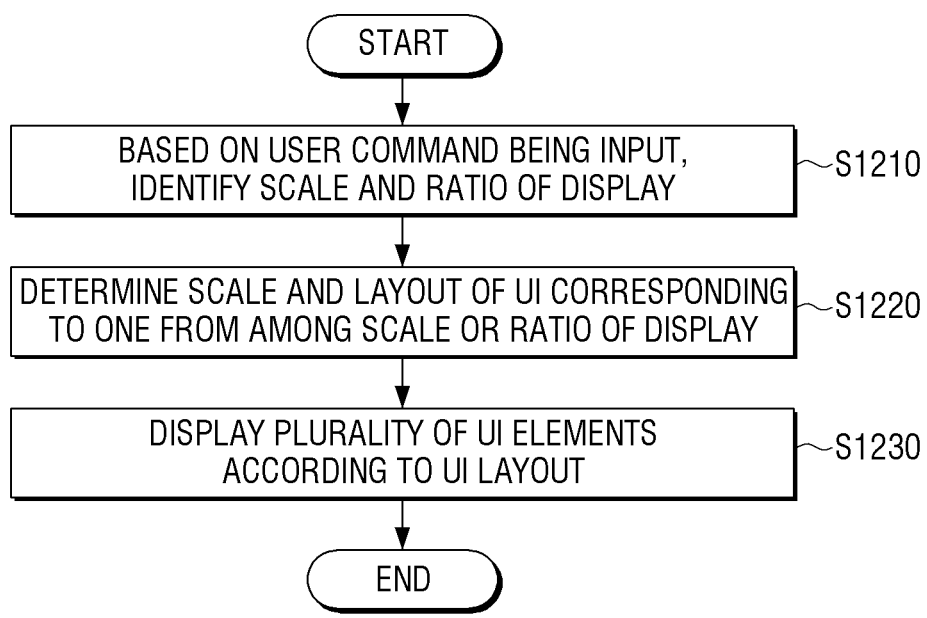
FIG. 12 is a flowchart illustrating a control method of a display apparatus according to an embodiment.

FIG. 12 is a flowchart illustrating a control method of a display apparatus according to an embodiment.

The display apparatus 100 may identify at least one from among the size and ratio of the display 110 when the user command for displaying the UI is input (operation S1210). The size and ratio of the display 110 may refer to the size and ratio of the screen or area which displays the content, image or UI. Further, according to an embodiment, the display apparatus 100 may change the size and/or ratio of the display 110 according to the user input, and identify the changed size and/or ratio of the display 110. Then, according to an embodiment, the display 110 may be implemented as a rollable display, and may identify the displayable area rolled out outside of the housing as the size of the display.

The display apparatus 100 may determine the size and layout of the UI corresponding to at least one from among the size or ratio of the display 110 (operation S1220). The display apparatus 100 may determine the layout of the UI based on the predetermined set value including at least one from among the minimum size, the maximum size, the margin, and the alignment method of each of the plurality of UI elements. According to an embodiment, the display apparatus 100 may identify the size of the UI according to the viewing distance of the user and the size of the display 110, and determine the layout of the UI based on the identified size of the UI.

The display apparatus 100 may, based on the size of the display 110 decreasing, decrease at least one from among the number of rows or the number of columns of the plurality of grids based on the size of the display, and determine the size of the UI to correspond to the decreased plurality of grids.

Alternatively, the display apparatus 100 may, based on the size of the display 110 increasing, increase at least one from among the number of rows or the number of columns of the plurality of grids based on the size of the display, and determine the size of the UI to correspond to the increased plurality of grids.

The display apparatus may display the plurality of UI elements according to the determined layout of the UI (operation S1230).

The display apparatus 100 may perform the displaying by disposing the UI and the plurality of UI elements based on the plurality of grids, into which the display 110 is divided according to the size of the display and the predetermined distance between the rows or the columns.

The display apparatus 100 may be configured so that the size of the display determines the size of the UI and the size of the plurality of UI elements based on the first layout if the size of the display is within the first threshold range. The first layout is changed to the second layout when the size of the display exceeds the first threshold range, and the UI and plurality of UI elements are displayed corresponding to the size of the display based on the second layout. As another example, the first layout is changed to the second layout when the size of the display becomes smaller than the first threshold range, and the UI and plurality of UI elements are displayed corresponding to the size of the display based on the third layout.

In an embodiment, the size of the UI and the UI element or the layout may be changed and, thus, the user may use an optimum UI according to the scale of the changed display area based on the size of the display 110 in the display apparatus 100 being changed.

The methods according to various embodiments described above may be implemented in a software or application format installable on a related art display apparatus.

The methods according to various embodiments may be implemented by only a software upgrade or a hardware upgrade on a related art display apparatus.

Embodiments described above may also be performed through an embedded server provided on a display apparatus or an external server of a display apparatus.

The control method of the display apparatus according to various embodiments may be implemented as a program and provided as a non-transitory computer-readable medium storing a software program.

The non-transitory computer-readable medium may refer to a medium that stores data semi-permanently rather than storing data for a very short time, such as a register, a cache, a memory or etc., and is readable by a device. In detail, the above-described various applications or programs may be stored and provided in the non-transitory computer-readable medium such as, for example, and without limitation, a compact disc (CD), a digital versatile disc (DVD), a hard disc, a Blu-ray disc, a USB, a memory card, a ROM, and the like.

While certain embodiments have been particularly shown and described with reference to the drawings, embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:

1. A display apparatus comprising:
a memory configured to store information on a scale factor,
a display; and
a processor configured to:
based on a user command for displaying a user interface (UI) being input, identify at least one from among a size of the display and a ratio of the display,
control to divide a screen of the display into a plurality of grids spaced apart from each other, based on the size of the display,
determine the scale factor corresponding to the size of the display,
determine a size of the UI according to a viewing distance of a user, the size of the display and the scale factor corresponding to the size of the display,
determine a layout of the UI based on the size of the UI,
control the display to align the UI of the determined size and a plurality of UI elements included in the UI on the plurality of grids,
control the display to display the aligned plurality of UI elements in the UI, according to the size and the layout of the UI, and
change the layout of the UI based on the size of the display being smaller than a sum of a minimum size of the plurality of UI elements,
wherein the processor is further configured to:
identify a first area of the display associated with a first viewing angle for which the user may comfortably recognize, based on the viewing distance, first information of the UI in the display, wherein the first viewing angle is determined by a first angle determined based on a first reference line which connects a first focal point of the user with the user,
identify a second area of the display associated with a second viewing angle for which the user may not comfortably recognize, based on the viewing distance, second information of the UI in the display, wherein the second viewing angle is determined by a second angle determined based on a second reference line which connects a second focal point of the user with the user, and
scale the UI based on the first viewing angle and based on the second viewing angle, whereby the user may easily recognize and interact with the UI.

2. The display apparatus of claim 1, wherein the display is divided into the plurality of grids comprising at least one from among rows and columns that are spaced apart from each other by a predetermined distance.

3. The display apparatus of claim 2, wherein the processor is further configured to:
based on the size of the display being decreased, decrease the plurality of grids by decreasing a number of the at least one from among the rows and the columns, based on the decreased size of the display, and determine the size of the UI to correspond to the decreased plurality of grids.

4. The display apparatus of claim 1, wherein the processor is further configured to:
based on the size of the display being within a first threshold range, cause the size of the display to determine a size of the plurality of UI elements, respectively, and the size of the UI, and control the display to display the UI and the plurality of UI elements in correspondence with the size of the display based on a first layout, and
based on the size of the display exceeding the first threshold range, change the first layout to a second layout, and control the display to display the UI and the plurality of UI elements in correspondence with the size of the display based on the second layout.

5. The display apparatus of claim 1, wherein the processor is further configured to determine the size and the layout of the UI based on receiving a user input identifying the at least one from among the size and the ratio of the display.

6. The display apparatus of claim 1, wherein the processor is further configured to determine the layout of the UI based on a predetermined value comprising at least one from among the minimum size, a maximum size, a margin, and an alignment, of the plurality of UI elements, respectively.

7. The display apparatus of claim 1, wherein the display is a rollable display, and
the processor is further configured to:
identify a size of a displayable area of the rollable display as the size of the display, and
determine the size and the layout of the UI based on the size of the displayable area of the rollable display.

8. The display apparatus of claim 1, wherein the display is a rotatable display, and
the processor is further configured to:
identify a ratio of the rotatable display that is changed according to a rotation of the rotatable display, and
determine the size and the layout of the UI based on the changed ratio of the rotatable display.

9. The display apparatus of claim 1, wherein the processor is further configured to:
align the plurality of UI elements on the plurality of grids so that the plurality of UI elements are centered on the plurality of grids,
based on the size of the display being changed, control to divide the screen into the plurality of grids, a number of which is changed in correspondence to the changed size of the display, and
control the display to re-center the plurality of UI elements on the plurality of grids, the number of which is changed.

10. A control method of a display apparatus storing information on a scale factor, the control method comprising:
identifying at least one from among a size of a display and a ratio of the display, based on a user command to display a user interface (UI) being input;
dividing a screen of the display into a plurality of grids spaced apart from each other, based on the size of the display;
determining the scale factor corresponding to the size of the display;
determining a size of the UI according to a viewing distance of a user, the size of the display and the scale factor corresponding to the size of the display;
determining a layout of the UI based on the size of the UI;
controlling the display to align the UI of the determined size and a plurality of UI elements included in the UI on the plurality of grids;
displaying the aligned plurality of UI elements in the UI according to the size and the layout of the UI; and
changing the layout of the UI based on the size of the display being smaller than a sum of a minimum size of the plurality of UI elements,
wherein the method further comprising:
identifying a first area of the display associated with a first viewing angle for which the user may comfortably recognize, based on the viewing distance, first information of the UI in the display, wherein the first viewing angle is determined by a first angle determined based on a first reference line which connects a first focal point of the user with the user,
identifying a second area of the display associated with a second viewing angle for which the user may not comfortably recognize, based on the viewing distance, second information of the UI in the display, wherein the second viewing angle is determined by a second angle determined based on a second reference line which connects a second focal point of the user with the user, and
scaling the UI based on the first viewing angle and based on the second viewing angle, whereby the user may easily recognize and interact with the UI.

11. The control method of claim 10, wherein the displaying further comprises dividing the display into the plurality of grids comprising at least one from among rows and columns that are spaced apart from each other by a predetermined distance.

12. The control method of claim 11, wherein the determining the size of the UI and the layout of the UI further comprises:
based on the size of the display being decreased, decreasing the plurality of grids by decreasing a number of the at least one from among the rows and the columns, based on the decreased size of the display; and
determining the size of the UI to correspond to the decreased plurality of grids.

13. The control method of claim 10, wherein the displaying further comprises:
based on the size of the display being within a first threshold range, determining, by the size of the display, a size of the plurality of UI elements, respectively, and the size of the UI, and displaying the UI and the plurality of UI elements in correspondence with the size of the display based on a first layout; and
based on the size of the display exceeding the first threshold range, changing the first layout to a second layout, and displaying the UI and the plurality of UI elements in correspondence with the size of the display based on the second layout.

14. The control method of claim 10, further comprising:
receiving a user input identifying the at least one from among the size and the ratio of the display,
wherein the determining the size of the UI and the layout of the UI further comprises determining the size of the UI and the layout of the plurality of UI elements based on the user input.

15. The control method of claim 10, wherein the determining the size of the UI and the layout of the UI further comprises:
determining the layout of the UI based on a predetermined value comprising at least one from among the minimum size, a maximum size, a margin, and an alignment, of the plurality of UI elements, respectively.

16. The control method of claim 10, wherein the display is a rollable display, and
the determining the size of the UI and the layout of the UI further comprises:
identifying a size of a displayable area of the rollable display as the size of the display; and
determining the size and the layout of the UI based on the size of the displayable area of the rollable display.

17. The control method of claim 10, wherein the display is a rotatable display, and
the determining the size of the UI and the layout of the UI further comprises:
identifying a ratio of the rotatable display that is changed according to a rotation of the rotatable display; and
determining the size and the layout of the UI based on the ratio of the rotatable display.

18. A non-transitory computer-readable storage medium storing information on a scale factor, the non-transitory computer-readable medium having recorded thereon at least one instruction which, when executed by at least one processor, causes the at least one processor to execute a control method including:
identifying at least one from among a size of a display and a ratio of the display, based on a user command to display a user interface (UI) being input;
dividing a screen of the display into a plurality of grids spaced apart from each other, based on the size of the display;

determining the scale factor corresponding to the size of the display;

determining a size of the UI according to a viewing distance of a user and, the size of the display and the scale factor corresponding to the size of the display;

determining a layout of the UI based on the size of the UI;

controlling the display to align the UI of the determined size and a plurality of UI elements included in the UI on the plurality of grids;

displaying the aligned plurality of UI elements in the UI according to the size and the layout of the UI; and changing the layout of the UI based on the size of the display being smaller than a sum of a minimum size of the plurality of UI elements, wherein the method further comprising:

identifying a first area of the display associated with a first viewing angle for which the user may comfortably recognize, based on the viewing distance, first information of the UI in the display, wherein the first viewing angle is determined by a first angle determined based on a first reference line which connects a first focal point of the user with the user, identifying a second area of the display associated with a second viewing angle for which the user may not comfortably recognize, based on the viewing distance, second information of the UI in the display, wherein the second viewing angle is determined by a second angle determined based on a second reference line which connects a second focal point of the user with the user, and scaling the UI based on the first viewing angle and based on the second viewing angle, whereby the user may easily recognize and interact with the UI.

19. The non-transitory computer-readable storage medium of claim 18, wherein the control method further includes:

dividing the display into the plurality of grids comprising at least one from among rows and columns that are spaced apart from each other by a predetermined distance;

based on the size of the display being changed, changing the plurality of grids by changing a number of the at least one from among the rows and the columns, based on the changed size of the display; and arranging the UI and the plurality of UI elements based on the changed plurality of grids so that the size of the UI corresponds to the changed plurality of grids.

* * * * *